Figure 1:
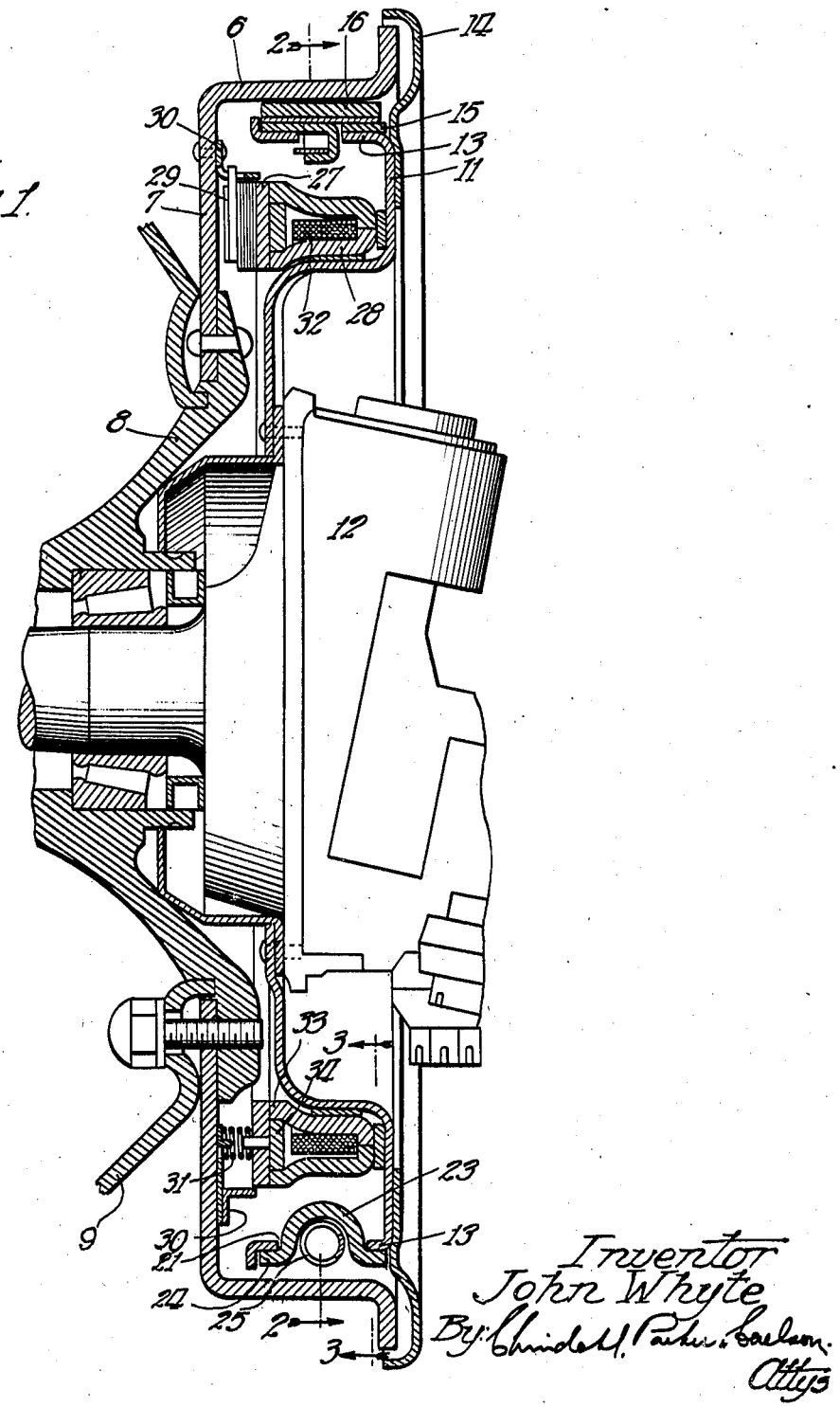

June 7, 1932. J. WHYTE 1,861,771
FRICTION BRAKE
Filed Feb. 17, 1930 2 Sheets-Sheet 1

Inventor
John Whyte
By Chindall Parker Carlson
Attys

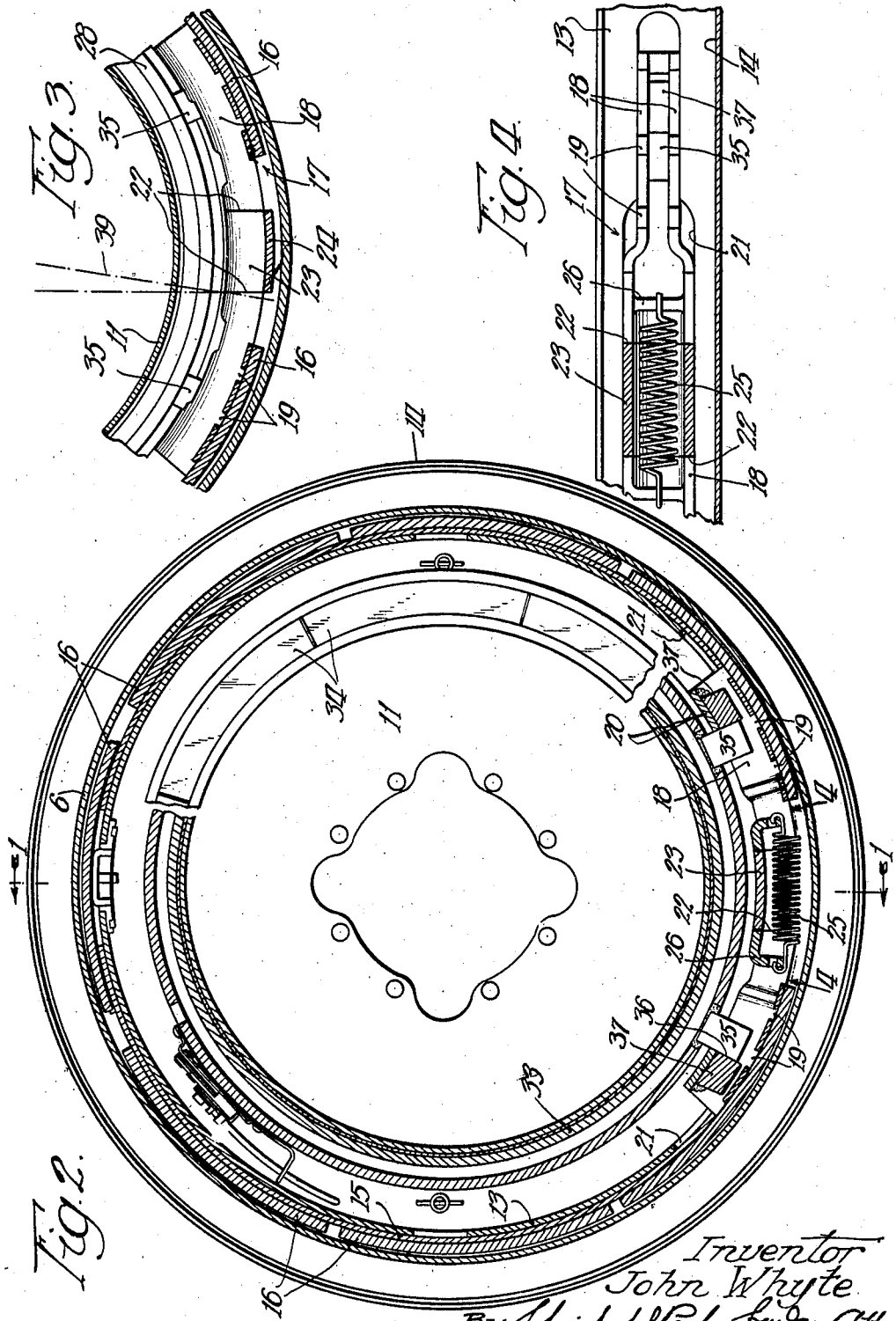

Patented June 7, 1932

1,861,771

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

FRICTION BRAKE

Application filed February 17, 1930. Serial No. 428,870.

This invention relates to friction brakes of the drum type such as are used on automotive vehicles and has more particular reference to an electric brake in which a momentum operator comprising two annular magnetic rings is embodied within the drum so that the brake and operator form a unitary structure capable of being mounted on a vehicle wheel.

One object of the present invention is to provide a brake of the above character in which the actuating force derived by the operator is applied to the braking means proper in a truly circumferential direction through the medium of a novel actuating mechanism which is so constructed and associated with the anchorage for the brake proper as to minimize the overall radial width of the brake and operator unit.

Another object is to provide a novel anchoring means for a brake of the full wrap band type which anchorage renders the band effective throughout its entire length.

Other objects and advantages of the invention will become apparent from the following detailed description taken in connection with the accompanying drawings, in which:

Figure 1 is a vertical sectional view of a vehicle wheel equipped with a brake embodying the features of the present invention, the section being taken substantially along the line 1—1 of Fig. 2.

Figs. 2 and 3 are sectional views taken along the lines 2—2 and 3—3 respectively of Fig. 1.

Fig. 4 is a fragmentary sectional view taken along the line 4—4 of Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings the invention is embodied in an electric brake including a rotatable drum 6 having the usual flange 7 bolted or otherwise secured to the inner end of a hub 8 of a vehicle wheel 9. The inwardly opening end of the drum is partially closed by an annular plate 11 suitably secured to a steering knuckle 12 or other relatively non-rotatable part. Integral with the outer peripheral edge of the anchor plate 11 is an annular flange 13 which projects into and is of a diameter slightly less than that of the drum. A separately formed ring 14 welded to the outer portion of the anchor plate overlies the edge of the drum and completely closes its open end.

In the present instance the non-rotatable part of the brake is of the band type comprising a metal strip 15 encircling the flange 13 on the anchor plate and carrying segments 16 of suitable friction material on its outer surface. The adjacent ends of the band are spaced apart so as to leave a vacant sector at one side of the drum and each is equipped with a fitting 17 comprising two spaced plates 18 extending along the inner surface of the strip 15 on opposite sides of its longitudinal center line. Lugs 19 on the plates project into apertures in the strip and securely hold the fittings and strip against relative movement.

The plates 18 are rigidly joined at 20 and project through an elongated slot 21 in the anchor flange 13. The slot is of sufficient length to allow for a limited degree of circumferential movement for each of the fittings 17.

The ends of the plates 18 which project beyond the end of the strip 15 are flared apart as shown in Fig. 4 and rigidly connected so as to define an end surface of U-shaped cross-section. The opposing end surfaces of the two fittings 17 are adapted for abutting engagement with oppositely facing surfaces 22 of a stop 23, also of U-shaped cross-section. The latter projects through the slot 21 and has arms 24 (Fig. 1) which are securely fastened against the flange 13 as by welding.

The fittings 17 are drawn toward each other and therefore normally held in abutment with the end surfaces of the stop by a contractile spring 25 whose opposite ends are hooked around cross members 26 between the flared ends of the plates 18. The spring 25 is located in the vacant drum sector between the ends of the band and therefore may be readily inserted after the band and all of the other parts of the brake have been assembled on the flange 13. From Figs. 1 and 4 it will be noted that the spring is disposed between the opposite side portions of the U-shaped stop 23 with its ends extending into the space between the fitting plates 18. Thus the spring and the stop both act along the longitudinal center line of the band so that there is no tendency for the band to bind under the forces applied by the stop or the spring.

The operator for spreading the ends of the band apart thereby setting the brake, comprises two rings 27 and 28 of magnetic material arranged concentric with the drum and adapted for axial gripping engagement. The ring 27, which constitutes the magnetic armature, is of rectangular cross sectional shape and relatively narrow axial width. Preferably this ring is of solid metal construction and floatingly supported from the drum so as to rotate therewith, at the same time being adapted for some degree of axial movement. To this end, the back of the ring is secured at annularly spaced points to the ends of flexible metal strips 29 which extend in a direction substantially tangent to the ring 27, and are rigid at their other ends with a ring 30 in turn riveted to the drum flange 7. When the wheel and drum with the armature unit mounted thereon are placed on the axle, the inwardly facing friction face of the armature ring is pressed lightly against the friction face of the magnet ring 28 by springs 31 acting in compression between the rings 27 and 30.

The ring 28 constitutes the magnet proper and is U-shaped in cross section with a winding 32 disposed between its two concentric poles 33, which are separated by plates 34 of non-magnetic material providing a wear resisting surface substantially flush with the end faces of the poles and adapted to sustain the axial pressure between the two magnetic rings. The magnet is supported by the anchor plate for oscillation about the drum axis.

Projecting rigidly from the outer magnet pole are two circumferentially spaced lugs 35 which extend into the space between the plates 18 of the band fittings 17 and provide oppositely facing abutments 36 which are spaced circumferentially to correspond to the spacing of the opposed shoulders formed on the band fittings by blocks 37 welded between the remote ends of the plates 18. Upon movement of the magnet in either direction away from normal brake-released position (Fig. 2), one or the other of the lugs 35 will move its end of the band away from the stop 23 thereby expanding the band and pressing its entire surface against the drum. Each abutment 36 and the cooperating shoulder engaged thereby are slightly inclined with respect to a true radial plane intersecting the abutment so that the actuated end of the band will not be held against outward movement by the lug 35 due to slight manufacturing inaccuracies in locating the abutment. It will be observed that the lugs 35 coincide with and therefore apply the actuating force along the longitudinal center line of the band. Each is adapted for a substantial degree of circumferential movement relative to its coacting block 37 by reason of the open slot between such block and the cross member 26.

When the magnet winding 32 is energized the magnetic attraction thus produced causes gripping engagement between the friction surfaces of the two rings proportional to the strength of the energizing current, whereupon the magnet ring will be driven frictionally by the armature ring, thereby moving with the wheel a short angular distance. In this movement one end of the band is moved away from the stop 23 which expands the band, thereby pressing the segments 16 against the drum surface. After the normal clearance has been taken up angular movement of the magnet ceases, causing slippage between the ring surfaces in the continued rotation of the wheel. When the current flow is interrupted the spring 23 acting through the medium of the fitting 17 and the active lug 35 serves to restore the magnet as well as the actuated end of the band to normal brake-released position.

By the employment of two circumferentially spaced actuating lugs 35 acting on the band at points spaced from the ends thereof, it will be apparent that the lugs and the stop 23 may be located equidistant from the wheel axis thereby minimizing the radial width of the brake and its operating unit. This permits the use of relatively large stop surfaces without increasing the radial dimensions of the unit.

Preferably the end surfaces 22 of the stop 23 are also inclined relative to true radial planes intersecting them. Preferably the amount of this inclination is slightly greater than the angle of repose of the two metal surfaces. As shown in Fig. 3, the direction of the inclination of the surface 22 relative to a radial line 39 is such that the active stop surface 22 exerts a camming or wedging action on the anchored end of the band fitting with the result that such end of the band is thrown outwardly against the drum and sustains its share of the braking pressure. Thus, it will be apparent that the entire length of the band is available for the development of a powerful wrapping action regardless of the direction of rotation of the vehicle wheel at the time when the brake is applied.

The actuating mechanism for the band above described and the arrangement of the stop and return spring provide for maximum compactness of the parts of the brake and operator unit even though the parts of the operator and the brake are located in the same vertical plane. Such compactness is desirable because it permits the use of magnetic rings of larger diameter and therefore greater effectiveness and also provides for a recess in the anchor plate which is large enough to accommodate steering knuckle constructions of widely varying sizes. At the same time large and ruggedly mounted anchoring surfaces are provided with the present construction which enables the entire length of the band to come into action and effectually prevents unnecessary vibration of the band when engaging the drum surface.

I claim as my invention:

1. A brake comprising a rotatable drum, a band extending around the internal drum surface and having adjacent separable end portions, a stop between said end portions, a spring stretched between said end portions and normally drawing the same into abutting engagement with said stop, a pair of opposed shoulders rigid with opposite end portions of said band and disposed substantially in radial positions, actuating means for said band including a magnetic ring concentric with the drum axis and movable in opposite directions away from a normal brake-released position, a pair of lugs rigid with and projecting outwardly from said ring at a point coincident with the longitudinal center line of said band, and a pair of outwardly facing abutments on said ring both engageable with said shoulders when both ends of the band are engaging said stop, said spring acting through the medium of said lugs to maintain said ring in normal brake-released position.

2. A brake of the character described combining a rotatable drum, a friction band extending around the inner drum surface, a stop positioned between the adjacent ends of said band, spring means normally drawing said ends into abutting engagement with said stop, a pair of magnetic friction rings disposed within said drum and concentric therewith, one of said rings being rotatable with the drum, the other being mounted for limited oscillation about the drum axis, and a pair of lugs rigid with and projecting outwardly from the latter friction ring and adapted upon oscillation of the ring in opposite directions to move one end or the other of said band away from said stop, said lugs being spaced circumferentially from said stop.

3. A brake of the character described combining a drum, a non-rotatable stop disposed adjacent the internal drum surface, a band extending around said surface and having its adjacent end portions arranged for abutting engagement with said stop, a pair of friction rings within said drum, one rotatable with the drum, the other being arranged for limited oscillatory movement about a drum axis when brought into gripping engagement with the other element, and means rigid with said oscillatory element for bringing one end or the other of said band away from said stop whereby to expand the band against the drum, said last mentioned means and said stop being spaced apart circumferentially of the drum so as to permit said rings and said band to be located close together.

4. A brake of the character described combining a rotatable drum, anchoring means having oppositely facing stop surfaces, a friction braking element extending around the internal cylindrical surface of said drum with its adjacent end portions normally abutting against said surfaces, an annular actuating member concentric with said element and arranged for limited movement about the drum axis and in opposite directions from a normal brake-released position, a pair of opposed shoulders on opposite ends of said element, and a pair of oppositely facing abutments on said member spaced circumferentially from said stop surfaces and each adapted upon movement of the member in one direction to engage one of said shoulders and move its end of the braking element away from said anchoring means, said stop surfaces and said abutments being substantially equidistant from the drum axis and overlapping each other so as to increase the radial compactness of the brake and actuating unit.

5. A brake of the character described combining a rotatable drum, a friction band extending around the cylindrical surface of said drum with its ends disposed adjacent each other on one side of the drum, a non-rotatable stop of relatively short circumferential length presenting end surfaces against which the ends of said band are normally held in abutting engagement so that one end or the other may be moved away from the stop to bring the band into gripping engagement with the drum, and actuating means for said band including an annular member movable about the axis and engageable with the respective ends of the band at points spaced circumferentially from the points of engagement between said ends and said stop, said member acting upon movement in either direction from a normal brake-released position to move one of said ends away from said stop and thereby apply the brake.

6. A brake of the character described combining a rotatable drum, a friction band extending around the drum, a non-rotatable stop against which the end portions of said band are normally held in abutting engagement, two opposed shoulders, one on each end portion of said band spaced from the end of the band, and a circumferentially movable actuating member having oppositely facing abutments spaced circumferentially to correspond to the spacing of said shoulders and each engageable with one of said shoulders and operable to move one end or the other of said band away from said stop depending on the direction of movement of the member.

7. A brake of the character described combining a rotatable drum, a friction band extending around the internal surface of said drum with its ends disposed adjacent each other, a non-rotatable stop having axially spaced side portions, the ends of which form abutments for engaging the opposite ends of said band, actuating means for moving one end or the other of said band away from its abutment, and a contractile spring disposed between the side portions of said stop and stretched between opposite ends of said band.

8. A brake of the character described combining a rotatable drum, a friction band extending around the internal surface of said drum with its ends disposed adjacent each other, a non-rotatable stop disposed between opposite ends of said band closely adjacent the inner drum surface, a spring normally drawing the opposite ends of said band into abutting engagement with said stop, and actuating means for moving one end or the other of said band away from said stop against the action of said spring, said spring and said stop being disposed equi-distant from the drum axis and both acting on said band along the longitudinal center line thereof.

9. A brake combining a rotatable drum, an anchor plate closing the open end of said drum, a flange on said anchor plate projecting into the drum closely adjacent the internal surface thereof, a friction band extending around said internal surface and having adjacent end portions disposed between said flange and drum, said flange having a circumferential slot therein adjacent said ends, a non-rotatable stop having spaced side portions rigid with said flange and disposed on opposite sides of said slot, said side portions having oppositely facing end surfaces arranged for abutting engagement with the ends of said band, a contractile spring stretched between the ends of said band and located in said slot between the side portions of said stop, and means disposed within said flange and movable circumferentially of said drum to move one end or the other of said band away from said stop.

10. A brake combining a rotatable drum, an anchor plate closing the open end of said drum, a flange on said anchor plate projecting into the drum closely adjacent the internal surface thereof, a friction band extending around said internal surface and having adjacent end portions disposed between said flange and drum, said flange having a circumferential slot therein adjacent said ends, a stop rigid with said flange and having oppositely facing surfaces against which the ends of said band are normally drawn, a pair of fittings each rigidly secured to one end of said band and projecting inwardly through said slot so as to be guided therein, and a circumferentially movable actuating member located within said flange and having two oppositely facing abutments engageable with the respective fittings so as to move one end or the other of the band away from said stop upon movement of said member in either direction.

11. A brake of the character described combining a rotatable drum, a band extending around the internal drum surface, a non-rotatable stop against which the adjacent ends of said band are normally drawn, said ends having opposed shoulders, an actuating member located within said band and movable circumferentially in opposite directions from a normal brake-released position, and a pair of oppositely facing abutments on said member engageable with said shoulders, said abutments having surfaces inclined relative to a radial plane intersecting them so that the abutment allows the actuated end of said band to move outwardly against the drum surface during actuation of the band.

12. A brake of the character described combining a drum, a friction band extending around the internal drum surface, a pair of fittings each rigid with one end of said band and comprising a pair of axially spaced plates extending longitudinally of the band on the inner side thereof, a non-rotatable stop having axially spaced side portions, the ends of which are arranged for abutting engagement with the opposing end portions of the plates comprising said fittings, a contractile spring disposed between the side portions of said stop with its ends extending into the space between the plates of said fittings, the opposite ends of said spring being attached to said fittings, an annular actuating member concentric with the drum, and a pair of lugs rigid with said member and each projecting into the space between the plates of one of said fittings, said lugs cooperating with shoulders on said fittings so as to move one end or the other of the band away from said stop upon movement of said member in either direction away from a normal brake-released position.

13. A brake of the character described combining a rotatable drum, a friction band extending around the internal drum surface and having fittings rigid with its opposite ends, each fitting comprising a pair of axially spaced plates extending longitudinally of the band on the inner side thereof, a non-rotatable stop against which the adjacent ends of said fittings abut, an annular actuating member concentric with the drum, and a pair of lugs rigid with said member and each projecting into the space between the plates of one of said fittings, said lugs cooperating with shoulders on said fittings so as to move one end or the other of the band away from said stop upon movement of said member in either direction away from normal brake-released position.

In testimony whereof, I have hereunto affixed my signature.

JOHN WHYTE.